United States Patent [19]
Cummings

[11] Patent Number: 5,466,014
[45] Date of Patent: Nov. 14, 1995

[54] CLAMP FOR LINE FITTING

[76] Inventor: Dave Cummings, 8493 SW. 184th Loop, Aloha, Oreg. 97007

[21] Appl. No.: 327,434

[22] Filed: Oct. 21, 1994

[51] Int. Cl.⁶ .................................................. F16L 35/00
[52] U.S. Cl. ........................ 285/92; 285/177; 285/328; 285/353
[58] Field of Search ..................... 285/80, 92, 177, 285/328, 353

[56] References Cited

U.S. PATENT DOCUMENTS

| | | | |
|---|---|---|---|
| 806,201 | 12/1905 | Sisco | 285/80 X |
| 1,284,029 | 11/1918 | Adams . | |
| 1,914,736 | 6/1933 | Coutu | 285/92 X |
| 2,241,089 | 5/1941 | Hampe et al. . | |
| 3,233,907 | 2/1966 | Stanton | 285/177 X |
| 3,670,795 | 6/1972 | Kupfrian | 151/29 |
| 4,236,736 | 12/1980 | Anderson | 285/177 X |
| 4,480,860 | 11/1984 | Foresta | 285/177 |
| 4,655,482 | 4/1987 | Myers et al. . | |
| 4,822,077 | 4/1989 | Hendrickson | 285/177 X |
| 5,094,491 | 3/1992 | Berghammer et al. . | |
| 5,127,679 | 7/1992 | Pouplier . | |
| 5,139,289 | 8/1992 | Koss . | |
| 5,222,768 | 6/1993 | Hofer et al. . | |
| 5,350,201 | 9/1994 | Bynum | 285/92 |

FOREIGN PATENT DOCUMENTS

| | | | |
|---|---|---|---|
| 163589 | 6/1990 | Japan | 285/92 |
| 624386 | 6/1949 | United Kingdom | 285/92 |

OTHER PUBLICATIONS

Cajon® Company, catalog, "VCR® Metal Gasket Face Seal Fittings", Apr., 1993.

Primary Examiner—Dave W. Arola
Attorney, Agent, or Firm—Klarquist Sparkman Campbell Leigh & Whinston

[57] ABSTRACT

A clamp for pipe line fittings is disclosed. The clamp fits over hexagonal nut fittings to prevent the fitting from loosening due to torque, vibration, or other stresses.

22 Claims, 2 Drawing Sheets

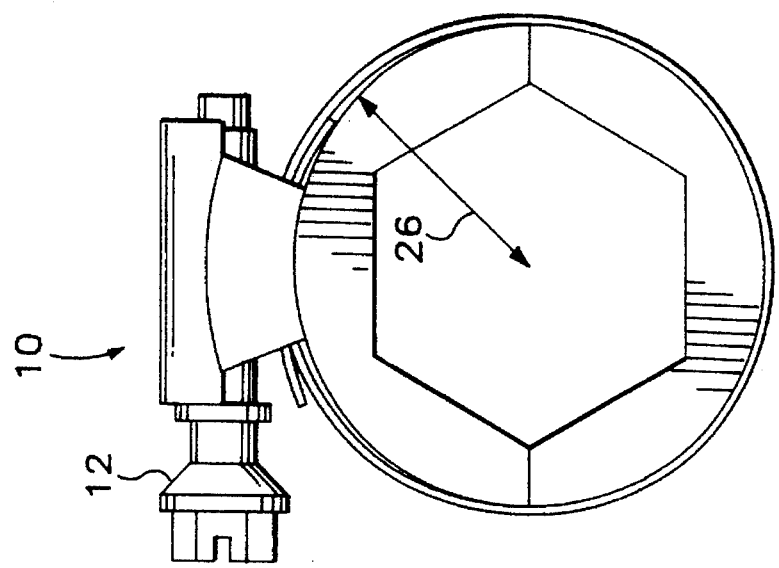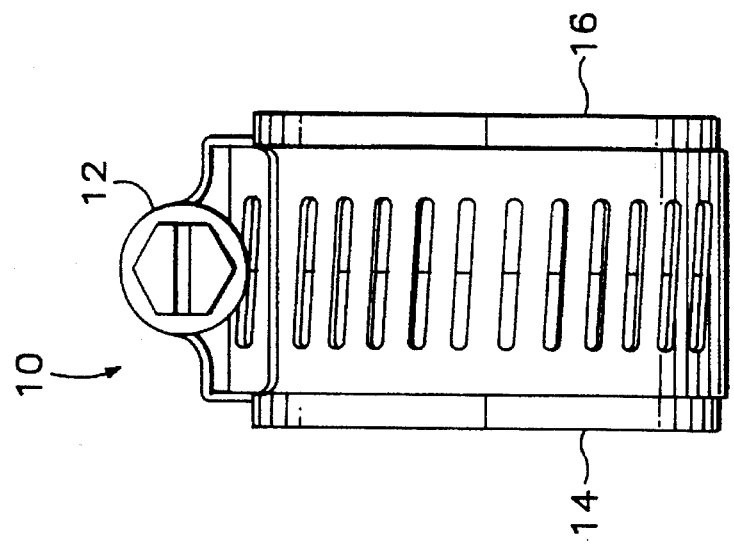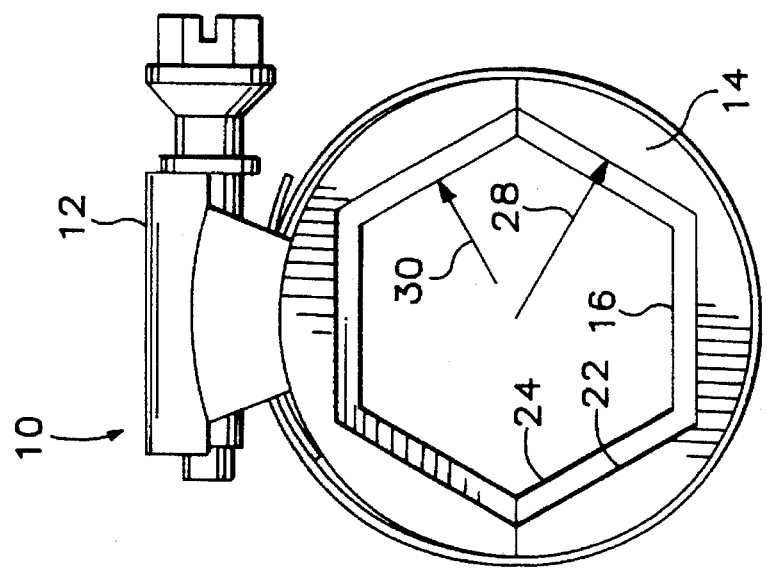

5,466,014

CLAMP FOR LINE FITTING

BACKGROUND OF THE INVENTION

1. Field of the Invention

This invention pertains generally to clamps for fittings associated with fluid lines.

2. Description of the Related Art

Many applications require that toxic or expensive fluids be piped from a source while under pressure. To accommodate this application, many precision products have been devised. One fitting that is used to provide a reliable fluid line connection is sold by Cajon, a division of Swagelok, under the brand name "VCR." These fitting systems require that glands be welded, threaded, or swaged onto the tube ends, male and female nuts are thereafter threaded together such that the gland of one pipe is pressed against the gland of another. A gasket is provided between the glands to ensure a leak-proof connection. Although these fittings provide generally reliable leak-free connections, it has been found that the fittings have a tendency to loosen due to vibration, counter-rotation of one gland against the other, or axial torque on the tubing.

U.S. Pat. No. 5,222,768 (Hofer et al.) discloses a fluid line nut-locking device that includes a pair of standard bolts and wrenches with shortened handles that are provided with ears so that the wrenches may be bolted together after inserting on a fitting. Although Hofer et al. would appear to provide a solution to prevent the fitting nuts from backing off under vibration or torque, the components of Hofer et al. would require special machining and/or a casting mold, thus making the device relatively expensive. In addition, the components of Hofer et al. must be installed prior to assembling the fitting.

SUMMARY OF THE INVENTION

Thus, what is needed is a simple and inexpensive, yet secure method of clamping a fluid line fitting to prevent its loosening during vibration or torque. The present invention provides a pair of rings that are sized to fit over the nuts of a fluid line fitting. Thereafter, an inexpensive, commercially available, pipe clamp is positioned around both rings and tightened thus securely holding the rings onto the nuts and the nuts together. Preferably, the rings are made of a polymer such as nylon. The rings may be provided as a single one piece ring having a circular outer surface and a hexagonal inner surface. The rings may be provided as one piece rings having a slit between their outer and inner surfaces which can be spread apart so that the rings can be slipped over a pipe line. Or, preferably, the rings may be provided as two or more sections that are positioned together in abutting contact and held in place by the pipe clamp. Often, in fluid line fittings, the one nut will be smaller than the other. Accordingly, the inner diameter of the two rings will have different dimensions to accommodate the different sizes of the coupling nuts. Additionally, the rings may be held in place by any suitable constrictor including pipe clamps, wire ties, or custom configured constricting bands.

Various advantages and features which characterize the invention are particularized in the claims which follow. However, for a better understanding of the invention and its advantages, reference should be had to the drawings which form a part hereof and to the accompanying descriptive matter in which there is illustrated and described preferred embodiments of the invention.

A BRIEF DESCRIPTION OF THE DRAWINGS

FIG. 2 is a side elevation view showing a preferred embodiment of a fitting clamp of the present invention.

FIG. 3 is an end elevational view of the fitting clamp of FIG. 2.

FIG. 4 is an opposite side elevation view of the fitting clamp of FIG. 2.

DETAILED DESCRIPTION OF THE PREFERRED EMBODIMENT

Figure 1:
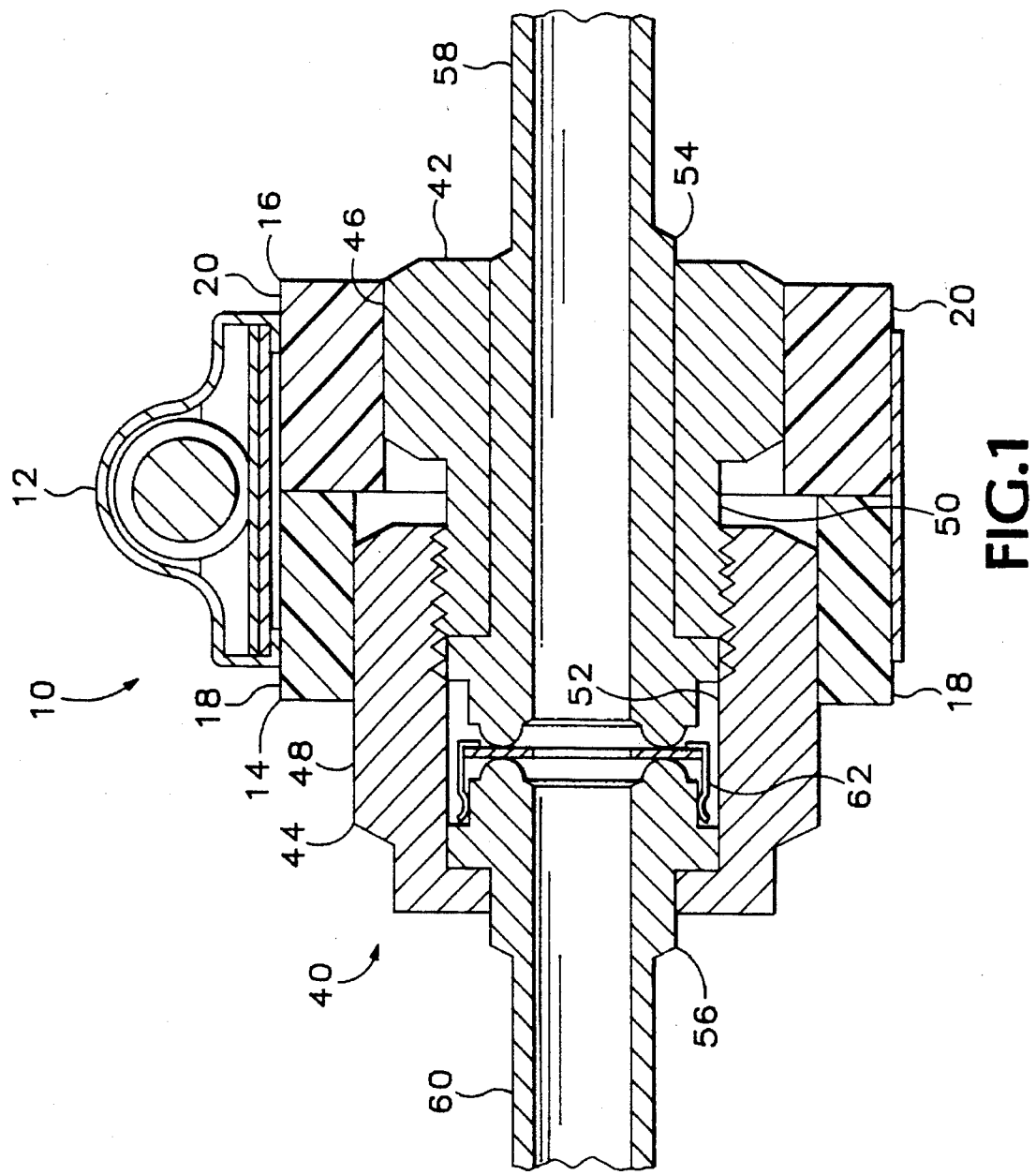
FIG. 1 is a cross-sectional view showing two fluid lines coupled together by a fitting which is held in place by a clamp of the present invention.

With reference to the accompanying figures, there is shown a preferred embodiment of a clamp 10 of the present invention. The clamp includes a band constrictor 12 and two rings 14 and 16. Each ring, 14, 16 has a generally cylindrical outer surface 18, 20, respectively, and a hexagonal inner surface 22, 24, respectively. The outer surfaces 18, 20, being generally cylindrical, have an associated radial dimension 26. The inner hexagonal surfaces 22, 24 also have associated radial dimensions 28, 30, respectively. In the case of the hexagonal inner surfaces 22, 24, the radii 28, 30 are defined as a dimension from an axial center to the closest point on the inner surface 22, 24. By way of alternate description, the radii 28, 30 are equivalent to the largest radii of a cylindrical object that would pass through a ring and just barely touch the inner surfaces 22, 24. For reasons explained in greater detail below, the radius 28, associated with the ring 14 is larger than the radius 30 which is associated with the ring 16. The radius 26, to the rings' outer cylindrical surfaces, is approximately the same for each ring 14 and 16.

With particular reference to FIG. 1, there is shown the fitting clamp 10 of the present invention attached to a fluid line fitting 40 connecting pipes 58 and 60. The fitting 40 includes a male nut 42 and a female nut 44, each having a hexagonal outer surface 46, 48, respectively. In some commercially available fittings the hexagonal surfaces 46, 48 are of different sizes. The male nut 42 includes threaded stand-off 50 that is received within a threaded bore 52 in the female nut 44.

The fluid line fitting 40 also includes glands 54 and 56 that are fixedly connected to pipes 58 and 60, respectively. The fitting 40 also includes a gasket 62 located between glands 54 and 56.

To connect together pipes 58 and 60, nuts 42 and 44 are first inserted over the pipes and pushed back out of the way. Thereafter glands 54 and 56 are fixedly attached to the pipe as by welding, brazing, threading or swaging. The gasket 62 is then positioned onto the gland 56 and the gland 54 is brought into axial alignment and contact with the gasket 62. Thereafter, the male nut 42 and female nut 44 are slid over the glands and threaded together thereby forcibly connecting pipes 58 and 60. The rings 14 and 16 are then positioned over the nuts 44 and 42, respectively such that the rings' inner surfaces 22 and 24 are nested on the nuts' hexagonal outer surfaces 48 and 46, respectively. The band constrictor 12 is then fitted over the rings 14 and 16 and tightened to provided radial pressure holding the rings securely onto the fitting 40. Where the nuts' hexagonal surfaces 46, 48 are of different sizes, the rings' inner surfaces 22, 24 must be sized differently to correspond. Thus, the inner surface 22 may have a different radius 28 than the radius 30 associated with inner surface 24.

The rings 14 and 16 are positioned on the fitting nuts 44 and 42 differently depending upon their configuration. Where the rings are provided as single pieces they must be slid onto the pipes 58 and 60 before they are joined together. In an embodiment wherein the rings are provided with a single slit between their outer surfaces 18, 20 and their inner surfaces 22, 24, respectively, then the ring may be circumferentially spread apart so the slits fit over the pipes 58 and 60. They may then be slid up over the nuts 44 or 42. In an embodiment in which the rings 14, 16 are provided in sections, then the sections may be arranged in abutting contact and positioned against the nuts 44, 42 and manually held in place while the band constrictor 12 is fitted over the rings and secured.

The band constrictor 12 could be a commercially-available pipe clamp, as shown in the figures. Other types of constrictors could be used such as plastic cable ties or simple metal straps that are tightened and then crimped.

In the preferred embodiments, the plastic rings 14 and 16 are provided of nylon, but almost any material having sufficient rigidity would be suitable for the application. Preferably, the material would be a polymer for its ease in handling and forming, and its low cost.

The clamp 10 of the present invention is shown as described in connection with a commercially standard faceseal fitting 40 having glands 54, 56 and differently sized nuts 42, 44. The clamp 10 would also be compatible with commercially standard pipe thread fittings and compression fittings having similarly sized nuts.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, direction of rotation and arrangement of parts within the principle of the invention to the full extent indicated by the broad general meaning of the terms in the claims.

I claim:

1. A clamped line fitting for a first and second line comprising:
   (a) a first nut having an outer surface;
   (b) a second nut having an outer surface and wherein the second nut is matingly connected to the first nut;
   (c) a first ring having an inner surface that is matingly compatible with the outer surface of the first nut, the first ring being fitted onto the first nut;
   (d) a second ring having an inner surface that is matingly compatible with the outer surface of the second nut, the second ring being fitted onto the second nut; and
   (e) an annular band having an engagement means for engaging both the first and second rings thereby preventing the first nut from rotating relative to the second nut.

2. The clamped line fitting of claim 1 wherein the outer surfaces of the first and second nuts are hexagonal and the inner surfaces of the first and second rings are hexagonal.

3. The clamped line fitting of claim 1 wherein the first and second rings are polymeric.

4. The clamped line fitting of claim 1 wherein the annular band engagement means includes a constriction device such that operation of the constriction device causes the band to constrict the rings.

5. The clamped line fitting of claim 4 wherein the annular band is a pipe clamp.

6. The clamped line fitting of claim 1 wherein the first ring and the second ring have respective slits so that the rings can be circumferentially expanded so as to receive the first line and second line, respectively through the respective slits.

7. The clamped line fitting of claim 1 wherein the first ring and second ring are comprised of a plurality of sections that form an annular ring when in abutting contact.

8. A fitting clamp, comprising:
   (a) a first annular ring having two sections that form the first annular ring when in abutting contact, each section defining an arcuate outer surface and a faceted inner surface that is sized and shaped to receive a first portion of a fitting, wherein the first annular ring has a first outer diameter and a first inner diameter;
   (b) a second annular ring having two sections that form the second annular ring when in abutting contact, each section defining an arcuate outer surface and a faceted inner surface that is sized and shaped to receive a second portion of the fitting, wherein the second ring has a second outer diameter and a second inner diameter; and
   (c) a compressive means for maintaining the rings in place together when the first ring and second ring are located on the first and second portions of a fitting and the compressive engages the first and second rings.

9. The clamp of claim 8 wherein the first outer diameter is substantially equal to the second outer diameter and the first inner diameter is not substantially equal to the second inner diameter.

10. The clamp of claim 8 wherein the compressive means is a pipe clamp.

11. The clamp of claim 8 wherein the compressive means circumscribes the arcuate outer surfaces of first and second annular rings.

12. The clamp of claim 8 wherein the sections of the first annular ring and the second annular ring are disconnected and respectively arranged in abutting contact within the compressive means.

13. The clamp of claim 8 wherein the facetted inner surfaces of the first and second annular rings are hexagonal for matingly surrounding a hexagonal nut.

14. The clamp of claim 8 further including a tightening device for increasing the compressive force of the compressive means.

15. The clamp of claim 8 wherein the first and second annular rings are polymeric.

16. A clamp for line fittings, comprising:
   (a) a first ring having an outer surface and a hexagonal inner surface; and
   (b) a second ring having an outer surface and a hexagonal inner surface; and
   (c) an annular band arranged to circumscribe the first and second rings and having engagement means for engaging the outer surfaces of the first and second rings so as to prevent the first ring from rotating relative to the second ring.

17. The clamp of claim 16 wherein a diameter of the outer surface of the first ring is substantially equal to a diameter of the outer surface of the second ring.

18. The clamp of claim 16 wherein the hexagonal inner surface of the first ring is smaller than the hexagonal inner surface of the second ring.

19. The clamp of claim 16 wherein the first and second rings are polymeric.

20. The clamp of claim 16 wherein the annular band is a pipe clamp.

21. The clamp of claim 16 wherein the first and second rings include a slit between the inner surfaces and the outer surfaces.

22. The clamp of claim 16 wherein the first ring and second ring each have a plurality of sections that form an annular ring when arranged in abutting contact.

* * * * *